April 13, 1926.
J. E. GERVAIS
BRAKE
Filed Sept. 17, 1925
1,581,052
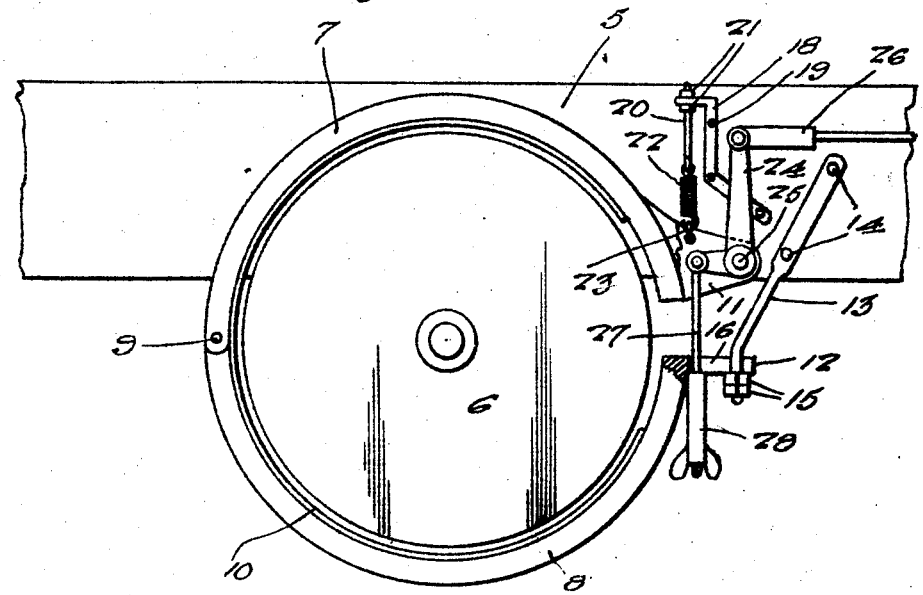
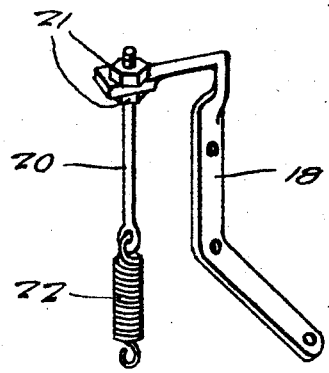
Inventor
J. E. Gervais
By Clarence A. O'Brien
Attorney Patented Apr. 13, 1926.

1,581,052

UNITED STATES PATENT OFFICE.

JOSEPH E. GERVAIS, OF MANVILLE, RHODE ISLAND.

BRAKE.

Application filed September 17, 1925. Serial No. 56,954.

*To all whom it may concern:*

Be it known that I, JOSEPH E. GERVAIS, a citizen of the United States, residing at Manville, in the county of Providence and State of Rhode Island, have invented certain new and useful Improvements in a Brake, of which the following is a specification.

The present invention relates to a brake of automobiles and other vehicles, and aims to provide a structure wherein the brake band is applied with even pressure all around the brake drum so as to cause an even wear on the brake lining.

Another important object of the invention is to provide a brake of this nature having a structure wherein both segments of the brake band will be released from the drum when the brake is in an off position, thus preventing unnecessary wear on the brake lining.

The above objects and others are carried out by an exceedingly simple construction, one which is thoroughly reliable and efficient in operation, strong and durable, not likely to easily become out of order, easy to manipulate and adjust, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is an elevation of the brake mechanism applied to and associated with the chassis of a vehicle and the brake drum, and Figure 2 is a detail perspective of a spring and bracket therefor forming a part of the brake mechanism.

Referring to the drawing in detail it will be seen that 5 designates the chassis of a vehicle, and 6 one of the brake drums. My brake band is formed in two sections 7 and 8, pivoted together as at 9, and having attached thereto in the usual manner brake lining 10 for engaging the periphery of the brake drum 6. A lug 11 is mounted at the extremity of the segment 7 and a lug 12 is mounted at the extremity of the segment 8. A bracket 13 is fixed to the chassis 5 as at 14, and has a pair of nuts 15 on its lower extremity. This bracket 13 depends from the chassis and extends through the slot 16 provided in the lug 12.

A bracket 18 is fixed to the chassis 5, and supports a bolt 20 which pierces the upper end of the bracket and is held in place by nuts 21. The lower end of this bolt 20 terminates in an eye for receiving one end of a coil spring 22 which is engaged with the lugs 11, as at 23, so as to normally hold the lining 10 of the segment 7 out of engagement with the periphery of the drum 6. A bell crank lever 24 is pivoted at the vertex of its angle as at 25 on the lug 11, at the extremity of the lug. The actuating rod 26 is pivotally engaged with the upper end of the bell crank lever 24. A bolt 27 is pivotally engaged with the other or lower end of the bell crank lever 24 and extends through the slot 16 of the lug 12. A thumb nut 28 is mounted on the lower end of the bolt 27 and is adapted to engage the under surface of the lug 12 so that the distance between the lugs 11 and 12 may be varied as desired for adjusting the brake band segments 7 and 8 to compensate for the wear on the lining 10, as is well known in this art.

When the rod 26 is pulled by the usual actuating mechanism, not shown, the bell crank lever 24 is rocked, thereby causing the lugs 11 and 12 to move toward each other because of the bolt 27 and nut 28, and thus the brake band segments 7 and 8 swing toward each other, that is the brake band is contracted about the brake drum 6. When the brake is released, the segment 8, by gravity, will move downwardly so as to disengage its lining 10 from the periphery of the drum 6, and simultaneously the spring 22 will lift the segment 7 so as to release its lining 10 from the periphery of the brake drum 6.

It is thought that the construction, utility, and operation, and advantages of the invention will now be clearly understood without a more detailed description thereof. It is desired however, to point out that the present embodiment of the invention has been disclosed merely by way of example since in actual practice it attains the features of advantage enumerated as desirable in the statement of the invention and the above description. It will be apparent that numerous changes in the details of construction, and in the combination and arrangement of parts may be resorted to without departing from the spirit or scope of the invention as hereinafter claimed or sacrificing any of its advantages.

Having thus described the invention, what I claim as new is:—

1. In combination, a frame, a brake drum, a brake band including a pair of segments pivotally associated together, lugs on the extremities of the segments, the lower lug being slotted, a bracket on the frame extending through the slot of the lower lug, nuts on the extremities of the bracket, a second bracket on the frame, a spring supported by said second bracket and engaged with the upper lug, a bell crank lever pivotally mounted at its vertex on the upper lug, means for swinging the bell crank lever, a bolt pivotally engaged with the bell crank lever and extending through the slot of the lower lug, and a nut on the extremity of said bolt.

2. In combination, a brake band including a pair of pivotally associated segments, each terminating in a lug, the lug of the lower segment being slotted, means limiting the downward movement of the lug of the lower segment, spring means engaged with the lug of the upper segment so as to normally hold said upper segment out of engagement with a brake drum, a bell crank lever pivoted on the lug of the upper segment, a bolt extending from the bell crank lever through the slot of the lug of the lower segment, and a nut adjustable on the lower extremity of the bolt.

In testimony whereof I affix my signature.

JOSEPH E. GERVAIS.